United States Patent [19]

Tomren

[11] 4,421,455

[45] Dec. 20, 1983

[54] DUCT LINING

[75] Inventor: Raymond H. Tomren, Scottsdale, Ariz.

[73] Assignee: The Garrett Corporation, Los Angeles, Calif.

[21] Appl. No.: 333,491

[22] Filed: Dec. 22, 1981

[51] Int. Cl.³ .................. F01N 1/02; F03B 11/00; F04D 29/66; B32B 3/12

[52] U.S. Cl. .................. 415/119; 181/286; 181/292; 181/222; 428/116

[58] Field of Search .............. 181/213, 222, 224, 291, 181/292, 286; 244/1 N, 53 B; 60/39.75; 415/119; 428/116-118

[56] References Cited

U.S. PATENT DOCUMENTS

| | | |
|---|---|---|
| 2,609,068 | 9/1952 | Pajah . |
| 2,745,509 | 5/1956 | Argentieri . |
| 2,870,857 | 1/1959 | Goldstein . |
| 2,951,004 | 8/1960 | Martin et al. . |
| 2,952,579 | 9/1960 | Merriman . |
| 3,033,307 | 5/1962 | Sanders et al. ............ 181/224 |
| 3,061,491 | 10/1962 | Sherrard et al. . |
| 3,166,149 | 1/1965 | Hulse et al. . |
| 3,211,253 | 10/1965 | Gonzaley . |
| 3,221,500 | 12/1965 | Hill ............................ 60/39.75 |
| 3,485,442 | 12/1969 | Anderson et al. . |
| 3,502,171 | 3/1970 | Cowan . |
| 3,511,336 | 5/1970 | Rink et al. .................. 181/224 |
| 3,630,312 | 12/1971 | Woodward et al. . |
| 3,712,846 | 1/1973 | Daniels et al. . |
| 3,767,499 | 10/1973 | Koss . |
| 3,819,009 | 6/1974 | Motsinger . |
| 3,821,999 | 7/1974 | Guess et al. . |
| 3,948,346 | 4/1976 | Schindler . |
| 3,948,347 | 4/1976 | Rutledge ..................... 181/291 |
| 3,977,492 | 8/1976 | Hankel ........................ 181/292 |
| 4,035,535 | 7/1977 | Taylor ....................... 181/292 X |
| 4,054,477 | 10/1977 | Curran ...................... 428/117 X |
| 4,056,161 | 11/1977 | Allen, Jr. ................... 181/290 |
| 4,084,336 | 4/1978 | Saylor et al. ............. 181/292 X |
| 4,235,303 | 11/1980 | Dhoore et al. ............ 181/222 X |
| 4,242,176 | 12/1980 | Riel ............................ 428/116 X |
| 4,254,171 | 3/1981 | Beggs et al. ................ 428/116 |
| 4,269,882 | 5/1981 | Carrillo et al. ............. 428/116 |
| 4,271,219 | 6/1981 | Brown ........................ 428/116 |
| 4,291,079 | 9/1981 | Hem ........................... 428/116 |
| 4,292,356 | 9/1981 | Whitmore et al. ......... 428/116 |
| 4,294,329 | 10/1981 | Rose et al. ................. 181/222 |
| 4,300,978 | 11/1981 | Whitmore et al. ....... 181/292 X |
| 4,313,524 | 2/1982 | Rose ........................... 181/291 |

FOREIGN PATENT DOCUMENTS 479823 2/1938 United Kingdom .

Primary Examiner—Benjamin R. Fuller
Attorney, Agent, or Firm—Terry L. Miller; Albert J. Miller

[57] ABSTRACT

A duct lining exposing a substantially smooth, liquid impermeable outer surface to fluid flowing therealong.

39 Claims, 4 Drawing Figures

DUCT LINING

BACKGROUND AND SUMMARY OF THE INVENTION

This invention relates to an acoustic lining for ducts for attenuating noise propagating through a fluid flowing within the duct; and, more particularly, to such a lining for use in the intake duct of a combustion turbine engine for attenuating the noise generated by the compressor of the engine.

A wide range of apparatus and methods are known for attenuating noise associated with flowing fluids such as air in a duct. One such method is to line the duct with a sound-absorbing bulk material such as fiber glass batting or cellular plastic foam. Another such method is to provide a sound absorbing structure including a perforate sheet bounding the air flow path on one side and on the other side bounding one or more sound attenuating cells. The sound attentuating cells may be partially or completely filled with a sound-absorbing bulk material. U.S. Pat. Nos. 3,033,307; 3,221,500 and 3,511,336 along with British Pat. No. 479,823 illustrate conventional apparatus and methods of attenuating noise in flowing fluids.

However, when conventional noise attentuating techniques are applied to the intake duct of a combustion turbine engine many problems and deficiencies become apparent. For example, bulk absorber materials are generally fibrous in nature and are fluid permeable. Thus, liquids such as water, fuel, and lubricating oil, which are frequently present in the intake duct of a combustion turbine engine, may soak into the absorber material reducing its noise attenuating capability and creating excess weight. Further, fuel and lubricating oil present a fire hazard. Moreover, dust, dirt and other particulate contaminants present in the air flowing into the engine are attracted to the bulk absorber material wetted with liquid. Such contaminants, if allowed to accumulate, may partially obstruct the engine intake duct and in extreme cases may slough off in aggregate chunks large enough to damage the engine. Moreover, bulk absorber materials generally do not have sufficient strength to withstand the rigours of use in a turbine engine. Consequently, such bulk materials must ordinarly be supported by a sheet metal structure. However, the sheet metal support structure must be at least partially perforate to allow noise to penetrate to the bulk absorber material. Consequently, liquids may also penetrate to soak into the bulk material. As a result, in some applications it has been proposed to employ the sheet metal support structure alone without the bulk absorber material. Purportedly, the sheet metal structure with perforations leading to empty cells, which would normally house the bulk material, will attenuate noise. However, the shortcomings of such a simplistic solution to the problem have been recognized. Therefore, another conventional proposal has been to provide a rather elaborate sheet metal wall structure defining baffles, moats and drains for liquid control between the air flow path and the bulk absorber material. Of course, such a structure is somewhat complex and expensive to produce and cannot entirely eliminate the problem of liquid soaking into the bulk absorption material. U.S. Pat. No. 4,035,535 illustrates a recent example of this latter approach to the problem outlined above.

In addition to all of the deficiencies outlined above, conventional sound attenuating structures have a further deficiency which until now has been overshadowed by the need to provide satisfactory sound attenuation while avoiding liquid absorption. This further deficiency stems from the perforate sheet metal which conventionally confronts the air flow. The problem is that the multitude of perforations interrupt the surface of the sheet metal so that they interrupt also the smooth flow of air along the sheet metal. The perforate sheet metal does not provide a desirable aerodynamic surface for the air flow. In other words, the perforations, although necessary, are undesirable because they generate turbulence and friction in the flowing fluid and a concomitant undesirable fluid pressure drop.

In view of the deficiencies of conventional noise attenuating apparatus, it is an object of this invention to provide duct lining method and apparatus which satisfactorily attenuates noise without the use of a bulk sound-absorbing material.

Another object is to provide duct lining which presents a substantially smooth outer surface to the fluid flowing in the duct.

Yet another object is to provide such a duct lining which is particularly useful in combustion turbine engines.

Still another object for this invention is to provide duct lining having an outer surface which is impermeable to liquids at atmospheric pressure.

Another object is to provide a kit for retrofitting duct lining according to this invention to combustion turbine engines which may benefit from the improved noise attenuation offered by this invention.

In summary, this invention provides a duct lining having a first layer of air-permeable wire cloth defining a substantially smooth outer surface confronting the flowing fluid in a duct. The wire cloth is secured to a second support layer of perforate sheet metal. The second layer is secured to and spans the openings of a honeycomb structure defining resonator cells which are tuned to effect the greatest attentuation of the band of noise which is most objectionable.

Other objects and advantages of this invention will appear in light of the following detailed description of preferred embodiment of the invention.

DETAILED DESCRIPTION OF THE PREFERRED EMBODIMENT

Figure 1:
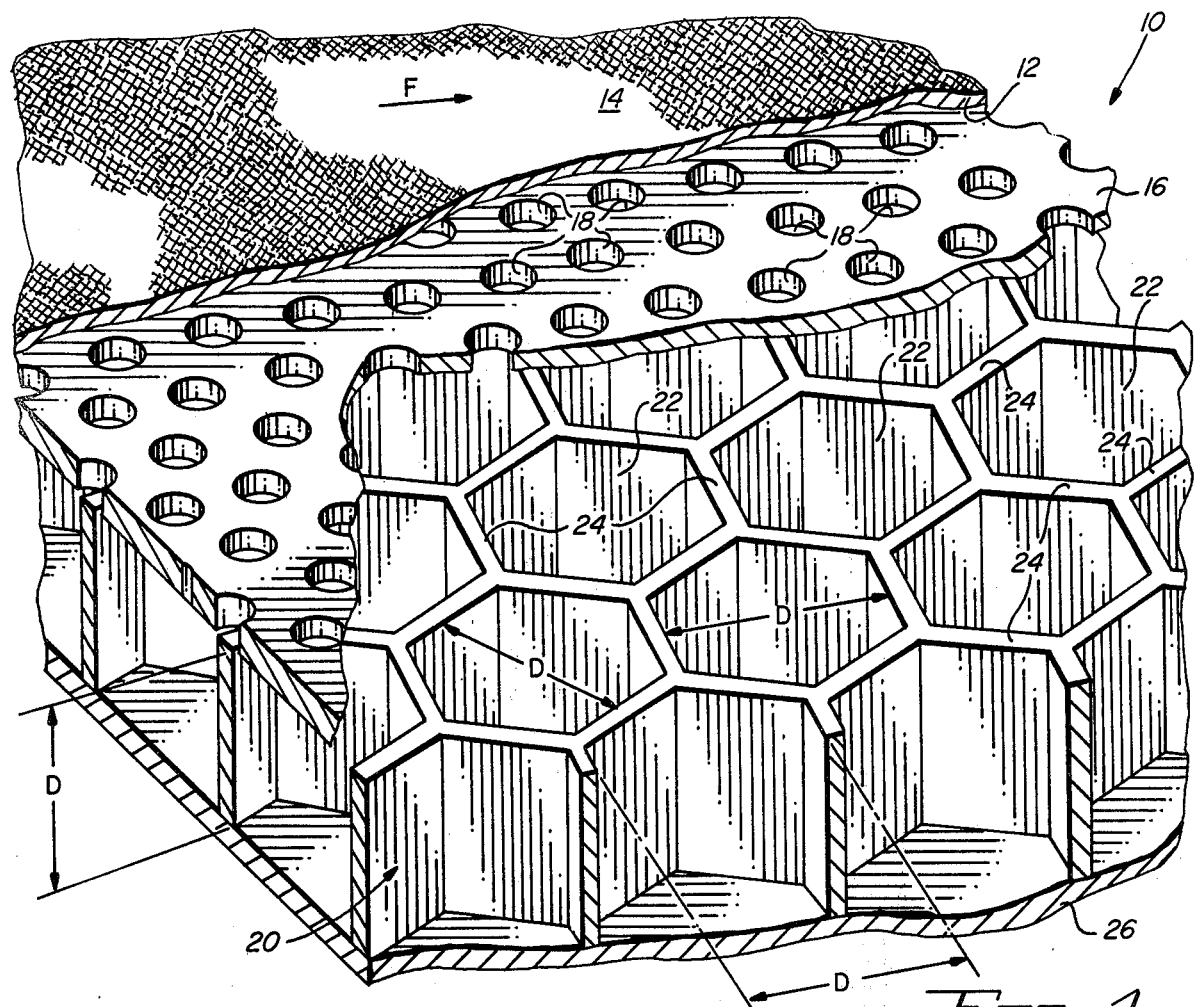
FIG. 1 is a fragmentary perspective view through a duct lining according to a preferred embodiment of the invention with portions thereof broken away for clarity of illustration.

FIG. 1 illustrates a duct lining 10 according to a preferred embodiment of this invention. Duct lining 10 includes a first layer of air-permeable wire cloth 12 which defines a relatively smooth outer surface 14 confronting air (represented by arrow 'F') flowing in a duct (not shown). Wire cloth 12 may be of woven or of matted construction. The wire cloth 12 is substantially impermeable to liquids at atmospheric pressure because of the fine mesh size of the wire cloth and the surface tension of liquids. For example, a 4 ply wire cloth having a wire size of 0.002 inch and a Tyler standard mesh size of 200 has been found to provide the proper degree of air permeability and liquid impermeability. Another example is a matted cloth of random 8 micron metal fibers. The matted cloth has a thickness of about 0.008 inch and about 28 percent open area. The air 'F' flows in a direction substantially parallel to the surface 14, as is illustrated. In order to support the wire cloth 12, duct lining 10 includes a second layer of perforate metal sheet 16 immediately below and in engagement with the wire cloth 12. Sheet 16 defines a multitude of spaced apart perforations 18 extending therethrough. The perforations 18 are approximately 0.045 inch in diameter and comprise about 37 percent of the area of sheet 16 which is 24 gauge material. In order to insure that the wire cloth 12 is uniformly supported and contrained from unwanted movement by the metal sheet 16, the wire cloth 12 and metal sheet 16 are bonded together by electron diffusion bonding.

Below the perforate sheet 16 is disposed a third layer of metal honeycomb structure 20. The honeycomb 20 defines a multitude of noncommunicating cells 22 extending therethrough. Each of the cells 22 is bounded by three pairs of spaced parallel walls 24 extending substantially perpendicularly from the perforate sheet 16 to a nonperforate back sheet 26. The spaced parallel pairs of walls 24 are all substantially equally spaced apart to define a distance 'D' therebetween. Because of the honeycomb structure 20, the perforate sheet 16 and back sheet 26 are also spaced apart by a distance 'D'. The honeycomb structure 20 is adhesively bonded to both the perforate sheet 16 and to the back sheet 26 so that the adhesive (not shown) seals the interface between the walls 24 and the sheets 16,26. Consequently, the cells 22 communicate with the flowing air 'F' only via the perforations 18 and the air-permeable wire cloth 12. The cells 22 are otherwise closed and do not directly communicate with one another.

Figure 2:
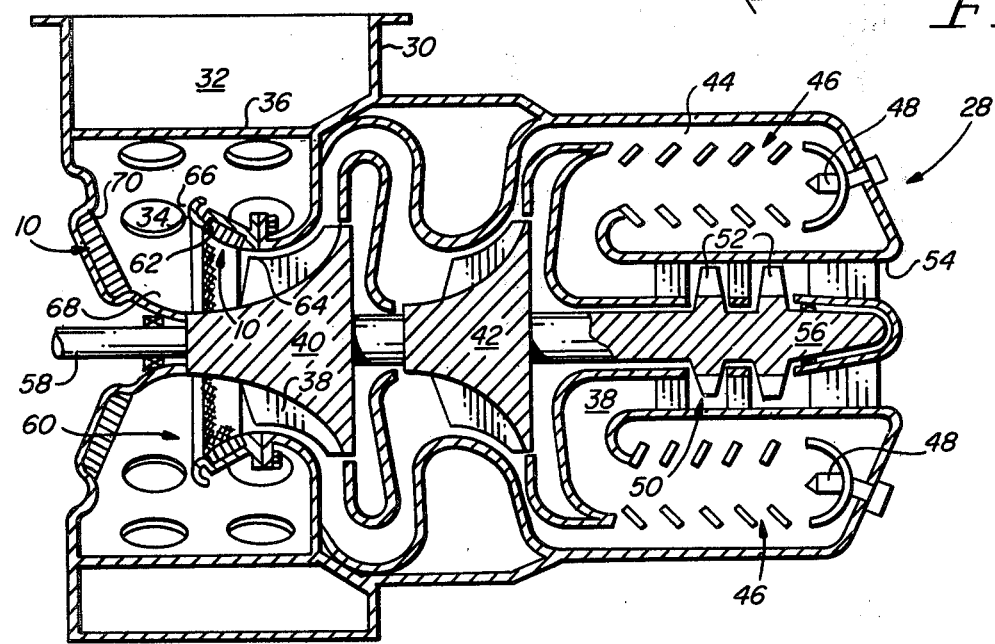
FIG. 2 schematically illustrates a cross-sectional view of a combustion turbine engine embodying the invention.

Having observed the structural details of the duct lining 10, attention may now be given to a particularly efficacous application of the duct lining 10 to a combustion turbine engine. FIG. 2 illustrates a combustion turbine engine 28 incorporating therein duct lining according to this invention. Engine 28 is of the type designed to produce mechanical shaft power. For example, engine 28 is of the type referred to as an auxiliary power unit (APU). APU's are employed on aircraft to drive power-consuming accessories of the aircraft.

Engine 28 includes an intake plenum 30 open at its upper end to the atmosphere, viewing FIG. 2. Plenum 30 defines a chamber 32 leading to an air inlet 34 via a perforate annular air distributor 36. Inlet 34 leads to an air flow path 38 extending through the engine 28. The flow path 38 traverses a first and a second centrifugal compressors 40 and 42, respectively, before opening into a chamber 44. A plurality of combustors 46 (only two of which are visible viewing FIG. 2) receive fuel via nozzles 48 to maintain combustion. From the combustors 46 the flow path 38 leads to a turbine section 50 having a pair of turbine wheels 52. From the turbine section 50, the air flow path 38 leads to an outlet 54 opening to the atmosphere. The turbine wheels 52 are drivingly connected to a shaft 56 which couples with the compressors 40 and 42. Shaft 56 also includes a portion 58 extending externally of the engine 28 to provide shaft power to a driven accessory (not shown).

During operation of the engine 28 the shaft 56 with compressors 40,42 and turbine wheels 52 rotates at a high speed. Consequently, the compressor 40, which communicates directly with the atmosphere via plenum 30, generates undesirable noise because of its high rotational speed. By way of example only, the engine 28 includes a compressor 40 including 17 blades and rotates at 40,000 R.P.M. Thus, 11,333 blade tips pass a stationary point in the inlet 34 each second. Consequently, the compressor 40 generates a characteristic noise having a frequency of 11,333 HZ. Further, because the shaft 56 passes through the inlet 34 and rotates at a high speed, the shaft 56 generates a characteristic noise simply because of its high rotational speed. In the example above, the shaft 56 generates a noise having a frequency of 666 HZ. Of course, the engine 28 generates a variety of other noises so that the noise emanating from the inlet 34 has a broad spectrum of frequencies.

In order to attenuate the noise emanating from the compressor 40 via inlet 34, the engine 28 includes an annular bell mouth member 60 which in part defines the inlet 34. Bell mouth member 60 defines an axially extending annular recess 62 circumscribing the inlet 34 and extending from adjacent a radially outer upstream blade tip edge 64 of compressor 40 to adjacent an upstream edge 66 of the bell mouth member 60. The recess 62 is filled with sound attenuating duct lining 10 as described in connection with FIG. 1. The duct lining 10 confronts the inlet 34 with the surface 14 of the wire cloth 12 substantially flush with the interior of the bell mouth member 60.

The engine 10 further includes a conical wall 68 confronting the inlet 34 and in part defining the plenum 30. The wall 68 defines a conical annular recess 70 confronting the inlet 34. Similarly to the recess 62, the recess 70 is filled with sound absorbing duct lining 10 according to FIG. 1. The duct lining in recess 70 also confronts the air flowing in intake 34 with the smooth upper surface 14 of wire cloth 12 substantially flush with the interior of wall 68.

During operation of the engine 28, air flows in the plenum chamber 30, through the diffuser 36 and into inlet 34. Conversely, sound emanating from the inlet 34 propagates upstream of the air flow and escapes from the plenum 30. Upon inspection of FIG. 2, it will be noted that the duct lining 10 in recess 62 is very close to the compressor 40, where a major part of the noise originates. Further, the duct lining 10 in recess 70 is in line-of-sight confronting relationship with the compressor 40. Consequently, a large part of the noise emanating from the compressor 40 impinges upon duct lining 10.

Recalling now the construction of duct lining 10, it will be seen that the upper surface 14 of the wire cloth 12 provides a substantially smooth surface for air to flow across on its way to compressor 40. However, the wire cloth 12 is air-permeable and acoustically conductive so that pressure waves (noise) pass through the wire cloth and into the cells 22 via the perforations 18. The cells 22 form Helmholtz resonators whose dimension "D" is selected to correspond to one-quarter of a wave length of the most objectionable sound emanating from the compressor 40. Consequently, noise which enters the cells 22 is attenuated with noise of a frequency having a one-quarter wavelength substantially equal to "D" being most attenuated.

In order to acoustically couple the cells 22 with the noise from compressor 40, the combination of wire cloth 12, perforate sheet 16 and honeycomb structure 20 is selected to have an acoustic impedance of approximately 70 rayls. The acoustic impedance is determined by measuring the mechanical impedance of a sample of the combination. The mechanical impedance is determined by directing a stream of air through the sample at a flow rate of 100 cubic centimeters per second per square centimeter of area. The pressure drop caused by the sample is measured and the equation set out below is used to calculate acoustic impedance:

$$R = \Delta P/V \text{ cgs rayls}$$

Where R, equals acoustic impedance; $\Delta P$, equals measured pressure differential across the sample and V, equals volume flow rate of air through the sample. Of course, the sample does not include a back sheet 26 because the back sheet is imperforate and would prevent measuring the acoustic impedance of the sample. A more comprehensive presentation of the above-described method of determining acoustic impedance is presented in section 10.3.1 of *Noise and Vibration Control*, by L. L. Beranek, 1971 McGraw-Hill Inc.

Moreover, those skilled in the acoustics art will note that the impedance of 70 rayls of duct lining 10 differs considerably from the impedance of air, which is approximately 43 rayls under standard conditions of pressure and temperature. Conventional understanding would dictate that the resonators defined in cells 22 be coupled to the air flow 'F' by a structure having an impedance matching that of air. However, it has been discovered that better noise attenuation is obtained if the coupling structure has an impedance of from about that of air to about twice that of air or more. In other words, the coupling structure may have an impedance in the range extending from about 40 rayls to about 100 rayls. The value of 70 rayls has been found to provide satisfactory noise attenuation while resulting in a wire cloth having satisfactory impermeability to liquids.

Figure 3:
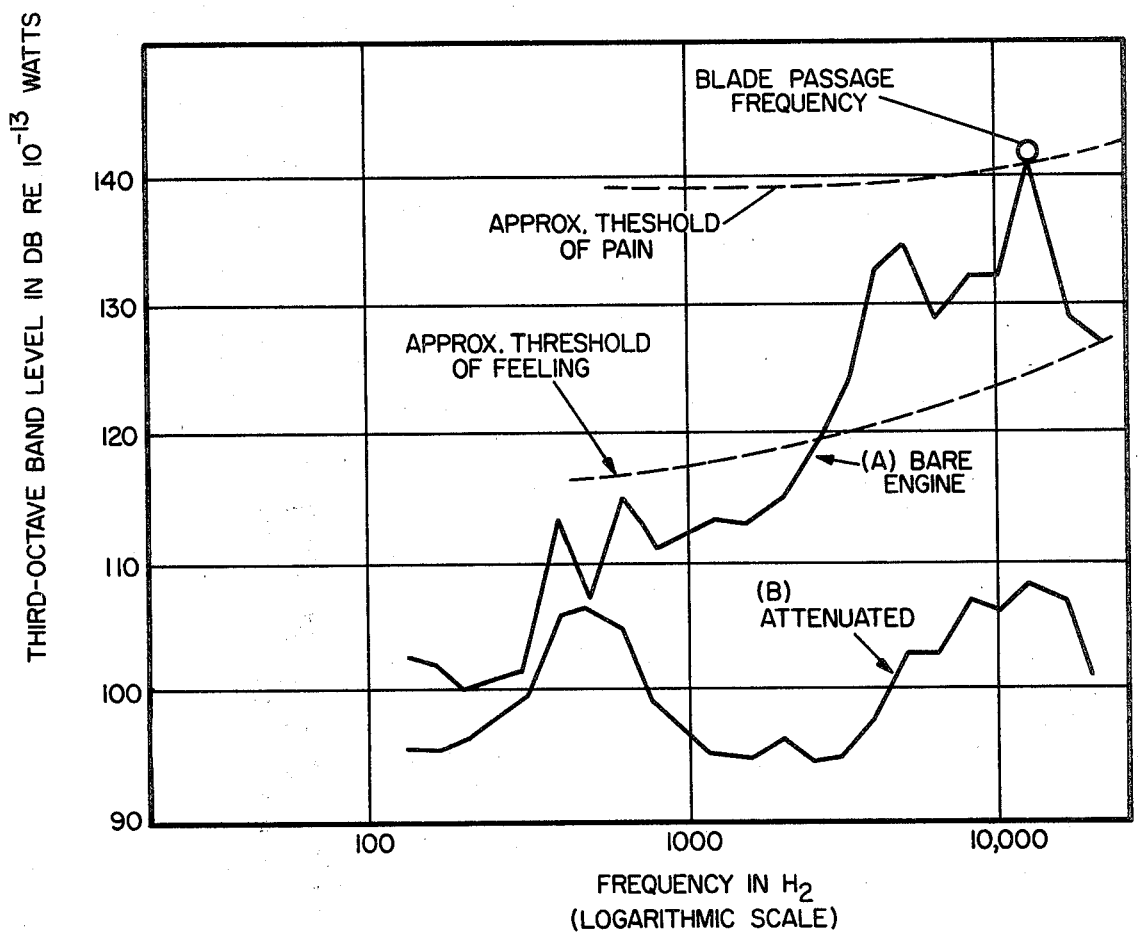
FIG. 3 is a graph illustrating the noise produced by an engine with and without attenuation according to this invention.

FIG. 3 illustrates graphically the noise generated at an air inlet leading to a combustion turbine engine with and without noise attenuation according to this invention. FIG. 3 is derived from test data on an APU installed in an aircraft. In this installation, the APU received air via a duct leading from the exterior of the aircraft to the plenum of the APU. Measurements were made of the noise emanating from the duct inlet on the exterior of the aircraft. The engine includes a compressor having 17 blades and rotating at a design speed of 40,000 R.P.M. Thus, this engine produced a blade passage noise at a frequency of 11,333 HZ as explained supra.

Examination of FIG. 3 will show tha the engine as installed without attenuation (line A) produces considerable noise over a broad frequency spectrum. In fact, the engine produces noise at some frequencies having an intensity which is above the threshold of feeling. Futher, the engine produces a noise peak at the blade passage frequency of 11,333 HZ which is approximately at the theshold of physical pain.

Line B of FIG. 3 illustrates the noise of the engine with noise attenuation by duct lining according to this invention. The duct lining was installed as explained with reference to the engine 28 illustrated in FIG. 2. Further, the interior of the engine plenum and of the duct leading to the plenum was lined with duct lining according to this invention. In accordance with this invention, the dimension 'D' of the honeycomb structure 20 of the duct lining 10 in the engine bell mouth member and confronting the engine compressor (viewing FIG. 1) was selected to be about one-quarter wave length of sound having a frequency corresponding to blade passage frequency. Thus, the dimension 'D' was approximately one-quarter of an inch. Line B illustrates that the intensity of the noise produced by the engine was reduced across its entire frequency spectrum by the duct lining. In particular, examination of FIG. 3 will show that the noise intensity at the blade passage frequency was reduced from approximately 142 db to about 108 db, a decrease of 34 db. Thus, the noise at the blade passage frequency was reduced to less than one-eighth of its level without attenuation.

Figure 4:
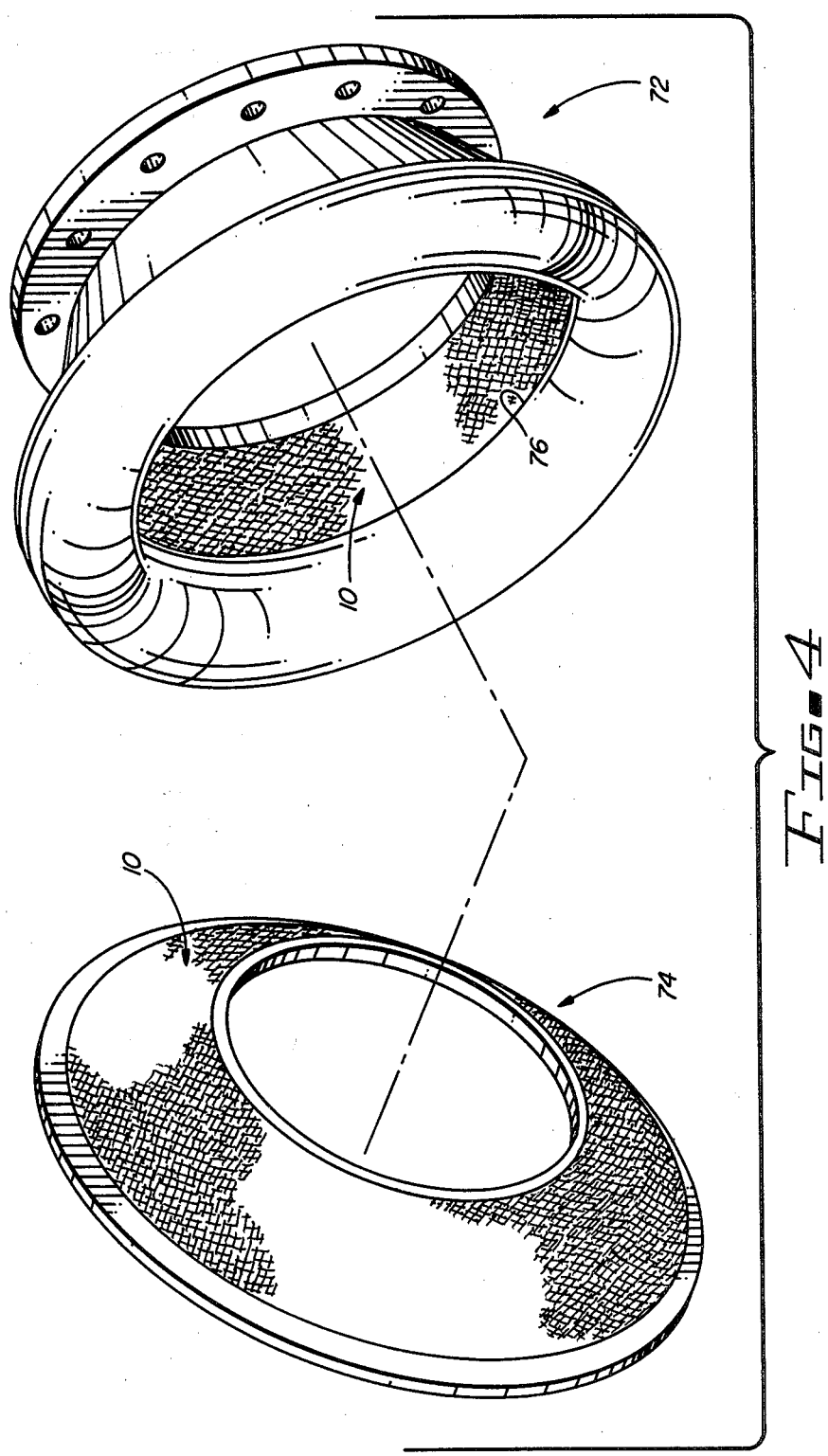
FIG. 4 is a perspective view of a pair of parts of a kit for retrofitting duct lining according to the invention to a combustion turbine engine.

FIG. 4 illustrates a pair of parts 72 and 74 which comprise a kit for retrofitting duct lining according to this invention to a combustion turbine engine (not shown). The part 72 is a bell mouth member adapted to replace the original bell mouth member of the engine. The part 72 includes an annular recess 76 receiving an annular ring of duct lining 10 according to this invention. The part 74 is an annulus of duct lining 10 according to this invention which is adapted to be installed in the engine in line-of-sight confronting relationship with the engine compressor. Thus, the part 74 is analogous in function to the duct lining 10 in the recess 70 of engine 28, viewing FIG. 2. Of course it will be understood that the cells 22 of the honeycomb structure 20 within the parts 72 and 74 may be chosen to have a dimension "D" substantially equal to one-fourth wavelength of the blade passage frequency of the engine for which the kit is intended.

Those skilled in the art to which this invention pertains will recognize that the invention is not limited to application to combustion turbine engines. For example, duct lining according to this invention could be used in an acoustical enclosure for an industrial machine such as a metal cutting or grinding machine which generates broad spectrum, penetrating noise in an environment contaminated with droplets and smoke from cutting coolant. In such an application, bulk sound absorbing material quickly becomes saturated with cutting coolant, which may be flammable. The duct lining 10 of this invention may be particularly applicable to such a use because of its liquid-impermeable wire cloth layer which prevents liquid soaking of the duct lining while still permitting acoustical coupling of the lining with the noise-containing environment. As such, it will be apparent that duct lining according to this invention is not limited to attenuation of noise associated with flowing air but that it may be used to attenuate noise in a variety of situations.

I claim:

1. A noise attenuating duct lining comprising:
   a first lamina of relatively nonrigid air-permeable filamentary cloth which is substantially liquid impermeable at atmospheric pressure;
   a second lamina of relatively rigid perforate material secured to said first lamina to support the latter, said second lumina being fluid-permeable;
   a third lamina of means for defining a multitude of cells opening to said second lamina, said second lamina being secured to said third lamina and arranged to span the openings of said cells of said third lamina.

2. The invention of claim 1 wherein said first lamina comprises a metal wire cloth.

3. The invention of claim 1 wherein said means for supporting said first lamina includes a perforate sheet of metal.

4. The invention of claim 1 wherein said third lamina comprises a honeycomb structure, said honeycomb structure defining a multitude of cells extending transversely therein and opening toward said second lamina.

5. The invention of claim 4 wherein said honeycomb structure includes an imperforate back sheet closing said cells opposite said openings thereof.

6. The invention of claim 4 wherein said honeycomb structure includes a multitude of spaced apart pairs of walls extending substantially perpendicularly to said second lamina, said pairs of walls cooperating to define said cells and to define a determined distance between said pairs of walls.

7. The invention of claim 6 wherein said honeycomb structure includes an imperforate back sheet spaced a certain distance from said second lamina.

8. The invention of claim 7 wherein said certain distance is substantially equal to said determined distance.

9. The invention of claim 2 wherein said wire cloth has a mesh number of substantially 200.

10. The invention of claim 2 wherein said wire cloth comprises a 4 ply cloth woven of 0.002 inch diameter wire.

11. The invention of claim 3 wherein said perforate sheet of metal defines a multitude of perforations each substantially 0.045 inch in diameter, said multitude of perforations cooperating to define substantially 37 percent of the area of said perforate sheet.

12. The invention of claim 1 wherein said duct lining has an acoustic impedance in the range from 40 to 100 rayls.

13. The invention of claim 1 wherein said duct lining has an acoustic impedance of substantially 70 rayls.

14. Noise attenuating apparatus comprising:
a first layer of air-permeable wire cloth, said wire cloth being substantially impermeable to liquids at atmospheric pressure, said wire cloth defining a first and a second opposite surfaces, said first surface being substantially smooth;
a second layer of perforate metal sheet secured to said second surface of said wire cloth;
a third layer of honeycomb structure sealingly secured to said second layer, said honeycomb structure defining a multitude of open-ended cells extending therethrough; and
a fourth layer of impermeable sheet sealingly secured to said third layer and closing the ends of said cells opposite said second layer.

15. The invention of claim 14 wherein said honeycomb structure cooperates with said second and said fourth layer to define a determined distance therebetween, said honeycomb structure including a plurality of spaced apart pairs of substantially parallel walls cooperating to define said multitude of cells, said pairs of walls cooperating to define a predetermined distance therebetween, and said predetermined distance being substantially equal to said determined distance.

16. The invention of claim 14 or 15 wherein said first, said second, and said third layers in combination have a mechanical impedance of substantially 70 rayls.

17. A combustion turbine engine including therein a duct lining according to claim 1.

18. A combustion turbine engine including therein a noise attenuating apparatus according to claim 14.

19. The invention of claim 14 wherein said wire cloth comprises a 4 ply cloth woven of 0.002 inch diameter wires, said wire cloth having a mesh number of substantially 200.

20. The invention of claim 14 wherein said perforate sheet defines a multitude of spaced perforations communicating therethrough, each one of said multitude of perforations being substantially 0.045 inch in diameter, said multitude of perforations cooperating to define substantially 37 percent of the area of said perforate sheet.

21. The invention of claim 14 wherein said apparatus has an acoustic impedance in the range from 40 to 100 rayls.

22. The invention of claim 21 wherein said apparatus has an acoustic impedance of substantially 70 rayls.

23. The invention of claim 14 wherein said wire cloth comprises random metal fibers of substantially 8 micron size, said metal cloth having a thickness of substantially 0.008 inch and an open area of substantially 28 percent.

24. A combustion turbine engine including a housing having a wall defining an air inlet, said air inlet leading to an air compressor of said engine, said wall carrying an annulus of duct lining according to claim 1, said annulus circumscribing said air inlet.

25. The invention of claim 24 wherein said engine further includes a second wall confronting said air inlet in line-of-sight relation with said compressor, said second wall carrying duct lining according to claim 1 in line-of-sight confronting relation to said compressor.

26. Noise attenuating apparatus comprising:
a first layer of air-permeable wire cloth defining a substantially smooth surface, said wire cloth being substantially impermeable to liquids at atmospheric pressure, and
a second layer of means for attenuating noise received therein, said second layer being adjacent said first layer and opposite said substantially smooth surface thereof, said smooth surface of said first layer being communicable with a noise-filled environment whereby said first layer transmits said noise into said second layer while substantially preventing transmittal of liquid into said second layer.

27. The invention of claim 26 wherein said means for attenuating noise includes means for defining a multitude of tuned acoustic resonators, each of said multitude of resonators being tuned to substantially the same frequency of resonance and communicating with said environment only via said first layer of air-permeable wire cloth while being isolated from one another.

28. The invention of claim 27 wherein said resonator-defining means includes a layer of honeycomb structure sandwiched between a pair of sheets, one of said pair of sheets being perforate and communicating with said first layer, the other of said pair of sheets being imperforate, said sheets sealingly cooperating with said metal honeycomb structure to isolate the cells thereof from one another.

29. A rotary compressor having a housing defining an air inlet to said compressor and noise attenuating apparatus according to claim 28 secured to said housing at said air inlet for attenuating noise generated by said compressor.

30. The rotary compressor according to claim 29 wherein said noise attenuating apparatus has an acoustic impedance in the range of from 40 to 100 rayls.

31. The invention of claim 30 wherein said noise attentuating apparatus has an acoustic impedance of substantially 70 rayls.

32. A kit for retrofitting noise attenuating duct lining to a combustion turbine engine, said engine including a first bell mouth member substantially defining an air inlet leading to a compressor of said engine, said kit including a second bell mouth member adapted to replace said first bell mouth member in said engine, said second bell mouth member including noise attenuating duct lining according to claim 15.

33. A kit for retrofitting noise attenuating duct lining to a combustion turbine engine, said engine including a first bell mouth member substantially defining an air inlet leading to a compressor of said engine, said kit including a second bell mouth member adapted to replace said first bell mouth member in said engine, said second bell mouth member including noise attenuating duct lining apparatus according to claim 15.

34. The method of making a noise attenuating duct lining comprising the steps of:
providing a first layer of air-permeable wire cloth, said wire cloth defining a pair of opposite faces, one of said opposite faces of said wire cloth being substantially smooth and impermeable to liquid at atmospheric pressure;
providing a second layer of perforate metal sheet adjacent the other face of said wire cloth, said perforate sheet defining a multitude of spaced perforations communicating therethrough;
electron diffusion bonding said first layer to and said second layer,
providing a third layer of honeycomb structure, said honeycomb structure defining a multitude of cells extending therethrough, said multitude of cells opening at one end thereof to said perforate sheet;
providing a fourth layer of imperforate sheet closing the other ends of said multitude of cells; and
adhesive by bonding said second and said fourth layers to said third layer of honeycomb structure to seal said multitude of cells from direct communication with one another.

35. The method of attenuating noise generated by a combustion turbine engine, said noise emanating from an air inlet of said engine, said method comprising the step of:
associating noise attenutating duct lining apparatus according to claim 1, 14, or 26 with said air inlet of said engine.

36. Noise attenuating apparatus particularly for turbo machinery, said noise attenuating apparatus comprising a first layer of noise attenuating material said first layer communicating with a noise-containing environment associated with said turbo machinery; and a second layer of air-permeable and accoustically conductive fibrous cloth interposed between said first layer and said noise-containing environment, said fibrous cloth being substantially impervious to a liquid at atmospheric pressure from the group composed essentially of water, turbo machinery lubricating oils, turbo engine fuel oils, and combinations thereof, said second layer of fibrous cloth transmitting noise from said noise-filled environment to said first layer while substantially preventing transmission of said liquids thereto.

37. The invention of claim 36 wherein said apparatus has an acoustic impedance in the range from 40 to 100 rayls.

38. The invention of claim 37 wherein said apparatus has an acoustic impedance of substantially 70 rayls.

39. A noise attenuating duct lining comprising:
a first lamina of relatively nonrigid air-permeable filamentary cloth which is substantially liquid impermeable at atmospheric pressure;
a second lamina of relatively rigid perforate material secured to said first lamina to support the latter, said second lamina being fluid-permeable;
a third lamina of means for defining a multitude of cells opening to said second lamina, said second lamina being secured to said third lamina and arranged to span the openings of said cells of said third lamina;
said first lamina comprising a metal cloth formed of random metal fibers of substantially 8 micron size, said metal cloth having a thickness of substantially 0.008 inch and an open area of substantially 28 percent.

* * * * *